(12) United States Patent
Kim et al.

(10) Patent No.: US 12,489,348 B2
(45) Date of Patent: Dec. 2, 2025

(54) SHAFT GROUND RING TO PREVENT BEARING ELECTRICAL EROSION

(71) Applicants: HJ TONG SANG CO., LTD., Gwangmyeong-si (KR); HAN JIN TRADING & ENGINEERING CO., LTD., Changwon-si (KR)

(72) Inventors: Min Hun Kim, Gwangmyeong-si (KR); Sung Yuhp Han, Busan (KR)

(73) Assignees: HJ TONG SANG CO., LTD., Gwangmyeong-si (KR); HAN JIN TRADING & ENGINEERING CO., LTD., Changwon-si (KR)

( * ) Notice: Subject to any disclaimer, the term of this patent is extended or adjusted under 35 U.S.C. 154(b) by 0 days.

(21) Appl. No.: 18/273,659

(22) PCT Filed: Jan. 27, 2022

(86) PCT No.: PCT/KR2022/001463
§ 371 (c)(1),
(2) Date: Jul. 21, 2023

(87) PCT Pub. No.: WO2023/145998
PCT Pub. Date: Aug. 3, 2023

(65) Prior Publication Data
US 2024/0396410 A1    Nov. 28, 2024

(51) Int. Cl.
*H02K 11/40*    (2016.01)
*F16C 41/00*    (2006.01)

(52) U.S. Cl.
CPC ............ *H02K 11/40* (2016.01); *F16C 41/002* (2013.01)

(58) Field of Classification Search
CPC ......... H02K 11/40; H02K 7/00; F16C 41/002; F16C 2380/26; F16C 19/52; H01R 2201/26; H01R 4/66; H01R 39/26; Y02T 10/64
See application file for complete search history.

(56) References Cited

U.S. PATENT DOCUMENTS

| 2007/0159763 | A1* | 7/2007 | Barnard ................ H02K 11/40 361/212 |
| 2017/0077663 | A1* | 3/2017 | Orlowski ............. H02K 5/1732 |
| 2018/0156276 | A1* | 6/2018 | Pogmore ................ H02K 11/40 |

FOREIGN PATENT DOCUMENTS

| JP | 2019-2497 A | 1/2019 |
| JP | 2019-509007 A | 3/2019 |

(Continued)

OTHER PUBLICATIONS

Communication issued Aug. 27, 2024 in Japanese application No. 2023-543119.

*Primary Examiner* — Tulsidas C Patel
*Assistant Examiner* — Mohammed Ahmed Qureshi
(74) *Attorney, Agent, or Firm* — Sughrue Mion, PLLC

(57) ABSTRACT

A shaft ground ring and an assembly thereof are disclosed. According to the present invention, there is provided a shaft ground ring fastened to a shaft of an electric motor to prevent electrical erosion caused by a leakage current, the shaft ground ring including a ring body formed to extend to surround an outer circumferential surface of the shaft and a plurality of ground protrusions formed to protrude from an inner circumferential surface of the ring body, being in contact with the outer circumferential surface of the shaft, and disposed to be spaced a predetermined gap from each other along the ring body. The present invention maintains (Continued)

a proper ground state in an oil cooled environment and thus can properly function a high-capacity electric motor.

10 Claims, 14 Drawing Sheets

(56) References Cited

FOREIGN PATENT DOCUMENTS

| | | |
|---|---|---|
| JP | 2019-192491 A | 10/2019 |
| JP | 2020-533934 A | 11/2020 |
| KR | 20-1998-0005666 U | 3/1998 |
| KR | 2012-210065 A | 10/2012 |
| KR | 10-2014-0023996 A | 2/2014 |
| KR | 10-2472503 B1 | 12/2022 |
| WO | 2021233542 A1 | 11/2021 |

* cited by examiner

SHAFT GROUND RING TO PREVENT BEARING ELECTRICAL EROSION

CROSS REFERENCE TO RELATED APPLICATIONS

This application is a National Stage of International Application No. PCT/KR2022/001463 filed Jan. 27, 2022.

TECHNICAL FIELD

The present invention relates to a shaft ground ring which prevents electrical erosion of a bearing caused by a leakage current.

BACKGROUND ART

With vehicle electrification, internal combustion engines are being replaced by electric motors. As the electric motor becomes a main power source, a problem of electrical erosion of a bearing is emerging. The bearing electrical erosion is a phenomenon in which a leakage current of an electric motor flows along a shaft, generates a spark, and causes damage to a bearing surface. The bearing electrical erosion can cause damage to the bearing or reduce a lifetime of the bearing. In addition, as the bearing is damaged, an electric motor, a reducer, and the like may be damaged. In particular, as the electric motor becomes a main driving power source, a use voltage is continuously increasing to improve performance and thus becomes a factor in further promoting the bearing electrical erosion.

A shaft ground ring has been known as one component to prevent bearing electrical erosion. The shaft ground ring is a component which allows a current flowing along the shaft to flow to the outside through a housing to reduce the bearing electrical erosion.

A pad type or brush type shaft ground ring mainly formed of carbon is known as a shaft ground ring used in a dry environment. As an example, Koran Patent Registration No. 10-2314718 discloses a brush-type device for preventing electrical erosion of bearing.

However, the conventional shaft ground ring for the dry environment is difficult to function properly in a high-power electric motor for a vehicle. Specifically, since the pad type used in the dry environment should be in close contact with a shaft to correspond to unbalancing of the electric motor, a relatively large friction may occur at a contact portion, and there is also a problem of wear due to the friction. Accordingly, there is an aspect that the pad type may not be suitable for a large capacity electric motor used as a main driving power source. In addition, since the pad type has a disadvantage of being in contact with one point, the pad type has a disadvantage that it is difficult to respond to a contact failure.

The brush type using carbon fiber has been developed to solve the problem of the friction or contact failure of the pad type described above. However, the brush type can function well in the dry environment, but in a large electric motor using an oil cooling method, there is a problem that insulation performance is degraded because a brush fiber is coated with oil.

Meanwhile, recently, an electric motor used as a driving power source of a vehicle has adopted an oil cooling method using oil as a cooling medium due to a high operating voltage. Accordingly, the conventional shaft ground ring for the dry environment is being supplemented through various methods. For example, Korean Patent publication No. 10-2019-0050559 discloses a shaft ground ring mount structure of a motor using cooling oil. The disclosed patent is directed to blocking oil from being introduced into a ground ring using a blocking unit in consideration of a problem that oil flowing out of two ends of the shaft is introduced into the ground ring (shaft ground ring) and degrades grounding performance of the ground ring.

Technical Problem

Embodiments of the present invention are directed to providing a shaft ground ring capable of preventing electrical erosion of a bearing caused by a leakage current, and an assembly thereof.

Embodiments of the present invention are directed to providing a shaft ground ring that maintains a proper ground state in an oil cooled environment to properly function in a high-capacity electric motor, and an assembly thereof.

However, technical objectives to be achieved by embodiments of the present invention are not necessarily limited to the above-described technical objectives. Other technical objectives, which are not mentioned, will be clearly understood to those skilled in the art to which the present invention belongs from other descriptions of the specification including a detailed description.

Technical Solution

In accordance with a first aspect of the present invention, there is provided a shaft ground ring fastened to a shaft of an electric motor to prevent electrical erosion caused by a leakage current, the shaft ground ring including a ring body formed to extend to surround an outer circumferential surface of the shaft and a plurality of ground protrusions formed to protrude from an inner circumferential surface of the ring body, being in contact with the outer circumferential surface of the shaft, and disposed to be spaced a predetermined gap from each other along the ring body.

In accordance with a second aspect of the present invention, there is provided a shaft ground ring assembly including the shaft ground ring and a housing fastened to accommodate the shaft ground ring therein.

In accordance with a third aspect of the invention, there is provided a shaft ground ring assembly including a shaft ground ring fastened to a shaft of an electric motor to prevent electrical erosion caused by a leakage current and a housing fastened to the shaft and configured to support the shaft ground ring at an outer circumferential portion of the shaft, wherein the shaft ground ring includes a plurality of ground protrusions formed to protrude from an outer circumferential surface of the shaft ground ring and disposed to be spaced a predetermined gap from each other in a circumferential direction.

Advantageous Effects

In a shaft ground ring and an assembly thereof according to embodiments of the present invention, a ground protrusion is in contact with a shaft to discharge a leakage current flowing along the shaft to the outside. Accordingly, electrical erosion of a bearing can be presented.

In addition, in a shaft ground ring and an assembly thereof according to embodiments of the present invention, while a plurality of contact points maintain contact states, a flow path may be formed in a front-rear direction or left-right direction. A first flow path in a circumferential direction is connected to an outer circumferential surface of a shaft through a gap, and a second flow path in the front-rear direction is directly connected to the outer circumferential surface of the shaft. Accordingly, oil for cooling and the like can be quickly discharged to the outside, and the degradation of insulation performance caused by the oil can be effectively prevented.

In addition, a shaft ground ring and assembly thereof according to embodiments of the present invention can properly respond to misalignment, imbalance of the shaft, and the like during assembly using a method in which a plurality of contact points are in contact with a shaft.

In addition, a shaft ground ring and an assembly thereof according to embodiments of the present invention can maintain a proper ground state even in an oil cooling environment using oil as a cooling medium and can be suitably applied to a high-capacity electric motor according to the above-described characteristics.

However, technical effects that can be achieved through embodiments of the present invention are not necessarily limited to the above-described effects. Other technical effects, which are not mentioned, will be clearly understood to those skilled in the art to which the present invention belongs from the other descriptions in the specification including a detailed description.

MODES OF THE INVENTION

Hereinafter, embodiments of the present invention will be described with reference to the accompanying drawings. The following embodiments may be provided to more completely describe the present invention to those skilled in the art. However, the following embodiments are provided to facilitate understanding of the present invention, and the technical spirit of the present invention is not necessarily limited to the following embodiments. In addition, detailed descriptions of components, which are known or determined to unnecessarily obscure the technical gist of the invention, will be omitted.

Figure 1:
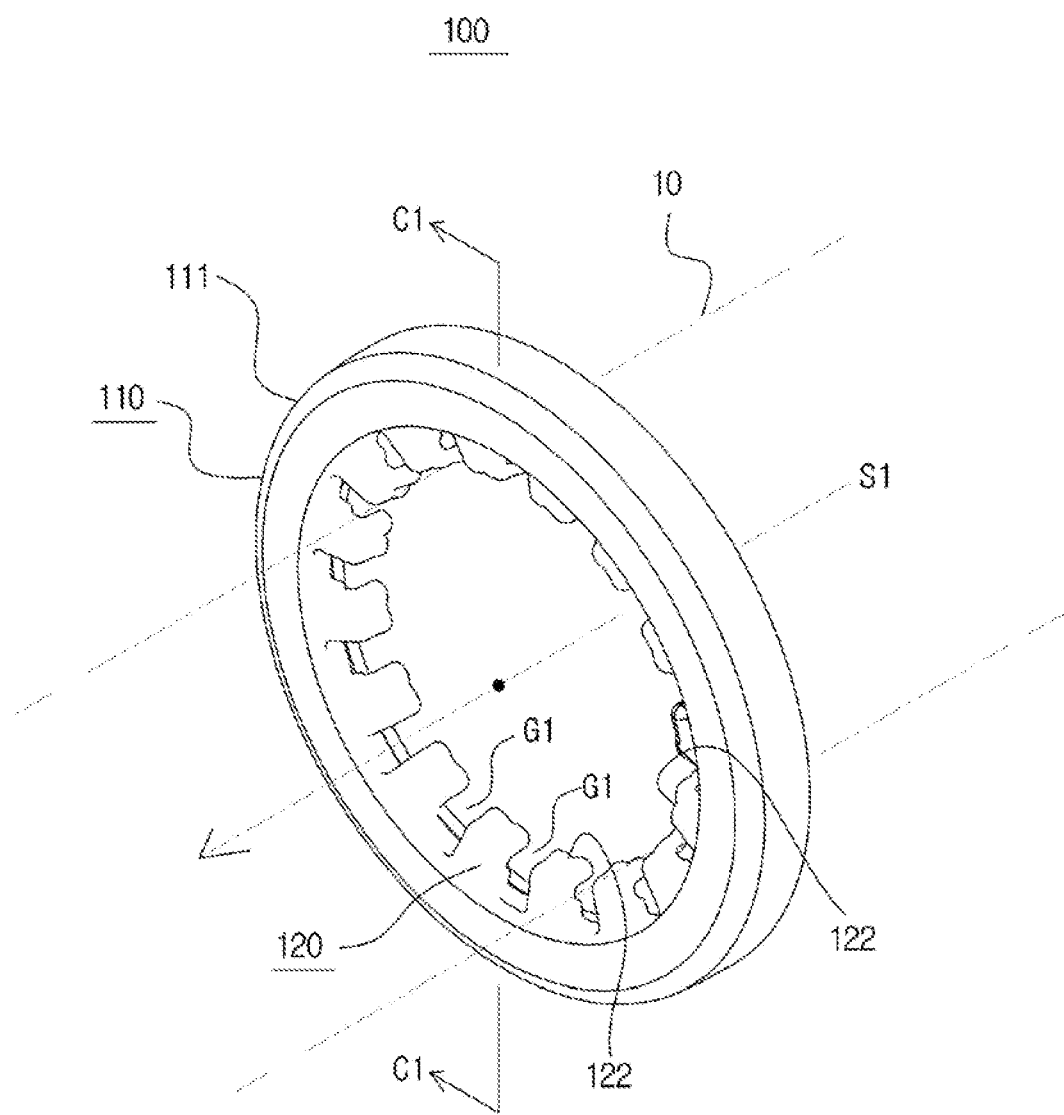
FIG. 1 is a front perspective view illustrating a shaft ground ring assembly according to a first embodiment of the present invention.
Figure 2:
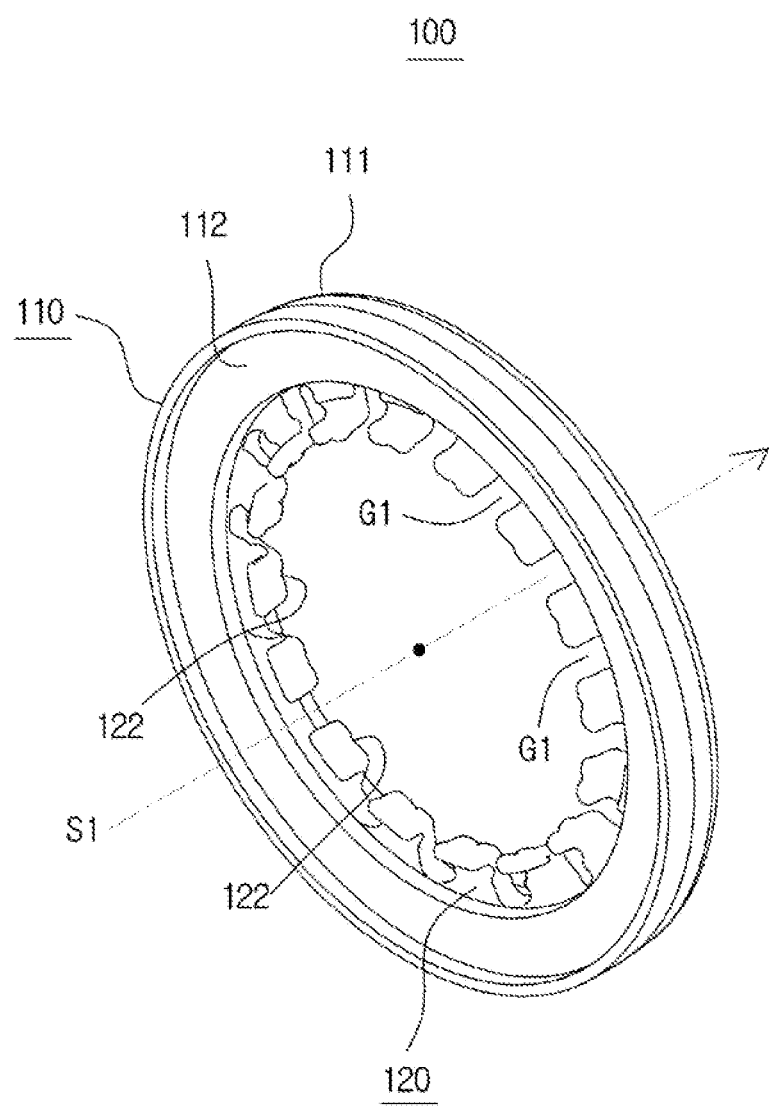
FIG. 2 is a rear perspective view illustrating the shaft ground ring assembly illustrated in FIG. 1.

FIG. 1 is a front perspective view illustrating a shaft ground ring assembly according to a first embodiment of the present invention. FIG. 2 is a rear perspective view illustrating the shaft ground ring assembly illustrated in FIG. 1.

Referring to FIGS. 1 and 2, a shaft ground ring assembly 100 (hereinafter, referred to as an "assembly 100") of the present embodiment may be used to prevent electrical erosion of a bearing caused by a leakage current. The assembly 100 of the present embodiment may more properly function in an oil cooling method using oil as a cooling medium. However, the assembly 100 of the present embodiment is not necessarily limitedly used in the oil cooling method.

The assembly 100 of the present embodiment may include a housing 110 and a shaft ground ring 120.

The housing 110 and the shaft ground ring 120 may be formed to extend to surround an outer circumferential surface of a shaft 10 in a circumferential direction. As illustrated, each of the housing 110 and the shaft ground ring 120 is formed in a substantially circular annular shape.

The shaft 10 may be formed to extend in a longitudinal direction. In the present description, the longitudinal direction of the shaft 10 will be referred to as a front-rear direction. The assembly 100 of the present embodiment may be used in a vehicle electric motor. In this case, the shaft 10 may be provided as a rotary shaft of the electric motor. However, the present invention is not necessarily limited thereto. As an example, the assembly 100 of the present embodiment may be used in a vehicle generator having a structure similar to the electric motor. In this case, the shaft 10 may be provided as a rotary shaft of the generator.

The shaft ground ring 120 may be fastened to an inner circumferential portion of the housing 110. The shaft ground ring 120 may be supported by the housing 110 using a predetermined coupling structure.

The shaft ground ring 120 may have an inner end portion disposed toward a central axis S1 of the shaft 10. The inner end portion of the shaft ground ring 120 may be in contact with and supported by an outer surface of the shaft 10. Accordingly, a leakage current flowing along the shaft 10 may be discharged through the shaft ground ring 120 to the outside of the housing or the like.

The shaft ground ring 120 may include a plurality of ground protrusions 122.

Each of the ground protrusions 122 may be formed to extend a predetermined extent from an inner circumferential portion of the shaft ground ring 120 toward the central axis S1. The ground protrusion 122 is a portion to be in direct contact with the outer surface of the shaft 10.

The plurality of ground protrusions 122 may be provided. The plurality of ground protrusions 122 may be disposed along the inner circumferential portion of the shaft ground ring 120 in the circumferential direction. Predetermined gaps G1 may be formed between the ground protrusions 122 disposed adjacent in the circumferential direction.

The shaft ground ring 120 may be formed as an integrated component including the plurality of ground protrusions 122. That is, the plurality of ground protrusions 122 may be integrally formed with the shaft ground ring 120.

A part or entirety of the shaft ground ring 120 may be formed of a plastic material. Preferably, the entirety of the shaft ground ring 120 may be formed of a plastic material. Alternatively, a part or entirety of the shaft ground ring 120 may be formed of a conductive plastic material. Preferably, the entirety of the shaft ground ring 120 may be formed of a conductive plastic material. As an example, the shaft ground ring 120 may be formed of a conductive plastic material of which a part or entirety includes a metal or carbon-based filler such as carbon black, carbon fiber, or carbon nanotube.

Figure 3:
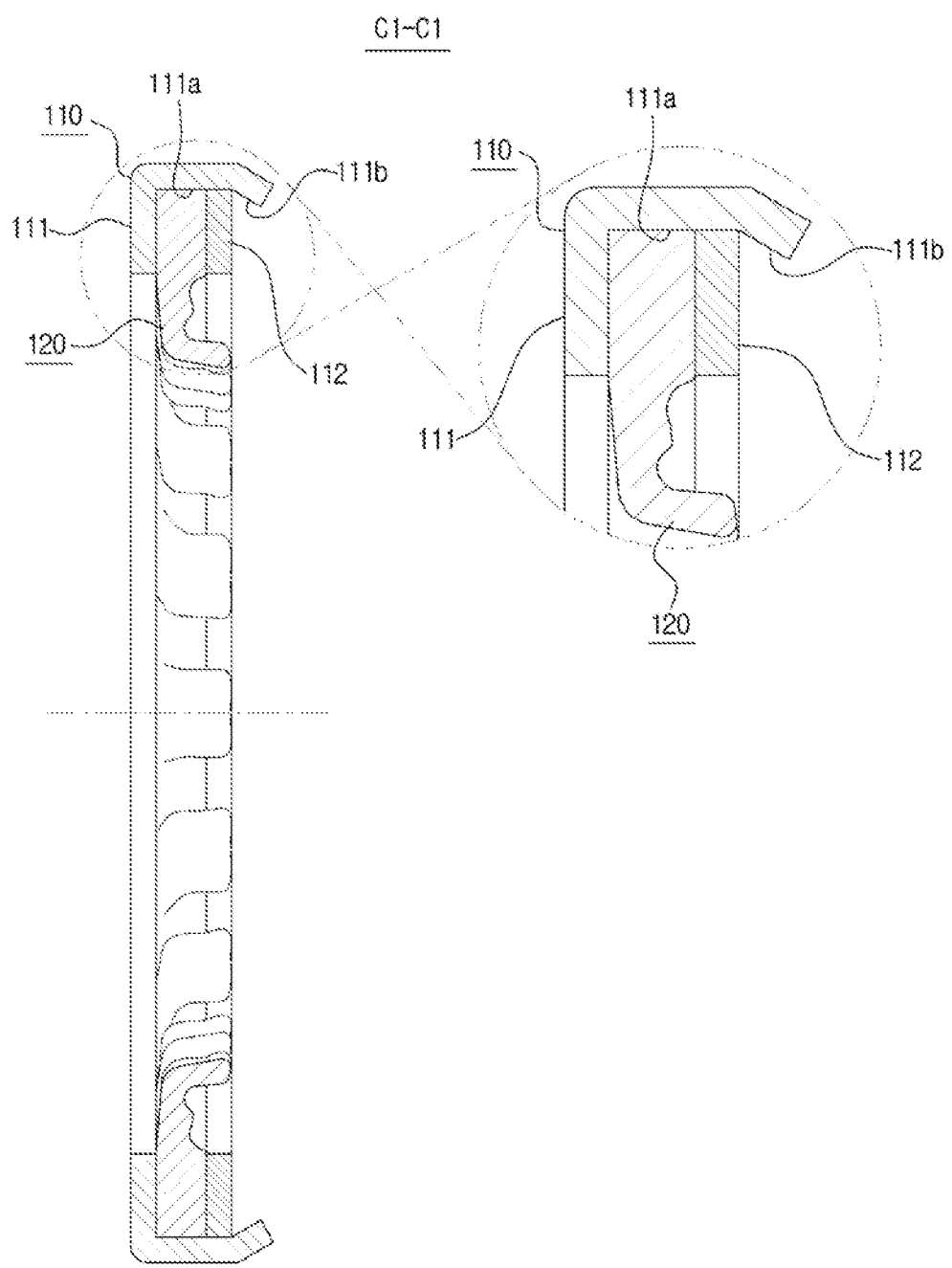
FIG. 3 is a cross-sectional view illustrating the shaft ground ring assembly illustrated in FIG. 1.

FIG. 3 is a cross-sectional view illustrating the shaft ground ring assembly illustrated in FIG. 1. In FIG. 3, a cross section of the shaft ground ring assembly along line C1-C1 illustrated in FIG. 1 is illustrated.

Referring to FIG. 3, the housing 110 of the present embodiment may include a housing body 111.

The housing body 111 may have a predetermined cross section and may be formed to extend in the circumferential direction to correspond to the outer circumferential surface of the shaft 10.

The housing body 111 may include a ring supporting surface 111*a* on an inner surface facing the shaft 10. The shaft ground ring 120 and a housing cover 112, which will be described below, may be in contact with and supported by the ring supporting surface 111*a*. The ring supporting surface 111*a* may extend a predetermined width in the front-rear direction to correspond to a thickness of the shaft ground ring 120 and a thickness of the housing cover 112.

A swaging 111*b* (swaging) may be formed behind the ring supporting surface 111*a*. The swaging 111*b* may be formed to be inclined to approach the central axis S1 of the shaft 10 toward a rear side. The swaging 111*b* may prevent the housing cover 112 from escaping from the rear side. Accordingly, the shaft ground ring 120 may be properly supported between the housing body 111 and the housing cover 112.

A part or entirety of the housing 110 including the swaging 111*b* may be formed of an elastic material. Accordingly, the housing cover 112 may be assembled with or disassembled from the swaging 111*b* through proper elastic deformation of the housing 110 or the swaging 111*b*.

Meanwhile, the housing 110 of the present embodiment may include the housing cover 112.

The housing cover 112 may be formed to extend in the circumferential direction to correspond to the housing body 111. The housing cover 112 may have a substantially circular ring shape.

An outer circumferential surface, at an outer side in a radial direction, of the housing cover 112 may be fastened to the ring supporting surface 111*a*. The housing cover 112 may be properly fixed between a rear surface of the shaft ground ring 120 and the swaging 111*b*.

Figures 4A, 4B, 4C:
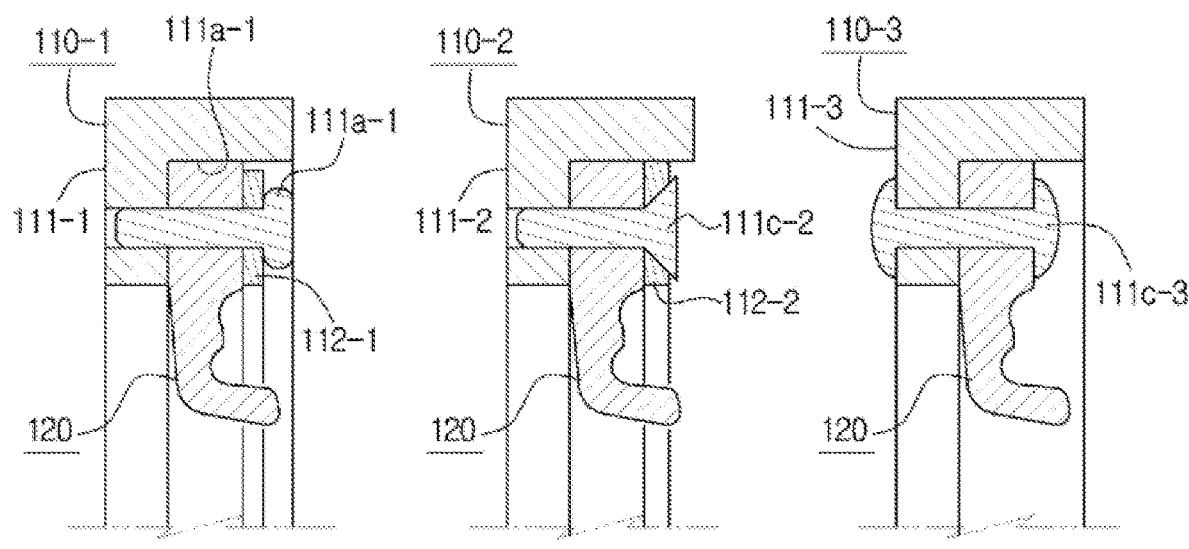
FIGS. 4A-4C are a set of views illustrating first to third modified examples of a housing illustrated in FIG. 3.

FIGS. 4A-4C are a set of views illustrating first to third modified examples of the housing illustrated in FIG. 3;

FIG. 4A is a view illustrating a housing 110-1 according to a first modified example.

Referring to FIG. 4A, the housing 110-1 of the present modified example may include a housing body 111-1.

The housing body 111-1 corresponds to the housing body 111 of the above-described embodiment. In general, the housing body 111-1 of the present modified example may be formed similarly to the housing body 111 of the above-described embodiment. That is, the housing body 111-1 may include a ring supporting surface 111*a*-1, wherein the shaft ground ring 120 is in contact with and supported by the ring supporting surface 111*a*-1.

However, in the housing body 111-1 of the present modified example, the swaging 111*b* of the above-described embodiment may be omitted. In the present modified example, the swaging 111*b* may be replaced by a fastening member 111*c*-1. Specifically, a fastening hole may be formed in each of the housing body 111-1, a shaft ground ring 120, and a housing cover 112-1 in a front-rear direction. The fastening member 111*c*-1 may be inserted from a side of the housing cover 112-1, pass through the shaft ground ring 120, and be inserted into and coupled to the fastening hole of the housing body 111-1. The shaft ground ring 120 may be fixedly installed between the housing cover 112-1 and the housing body 111-1 using the fastening member 111*c*-1.

The fastening member 111*c*-1 may include any type of known fastening part. As an example, the fastening member 111*c*-1 may include a bolt that is screw-coupled to the fastening hole.

Meanwhile, the housing 110-1 of the present modified example may include the housing cover 112-1.

The housing cover 112-1 may be formed substantially the same as or similar to the housing cover 112 of the above-described embodiment, except for the fastening hole for fastening the fastening member 111*c*-1.

FIG. 4B is a view illustrating a housing 110-2 according to a second modified example.

Referring to FIG. 4B, the housing 110-2 of the present modified example may include a housing body 111-2 and a housing cover 112-2, and the housing body 111-2 and the housing cover 112-2 may be fastened using a fastening member 112*c*-2, wherein a shaft ground ring 120 is interposed between the housing body 111-2 and the housing cover 112-2. In the present modified example, a shape of the fastening member 111C-2 is partially different from that of the above-described first modified example.

FIG. 4C is a view illustrating a housing 110-3 according to a third modified example.

Referring to FIG. 4C, the housing 100-3 of the present modified example may include a housing body 111-3. A fastening hole for fastening a fastening member 111*c*-3 may be formed in the housing body 111-3. The housing body 111-3 of the present modified example may be formed substantially the same as or similar to those of the above-described modified examples.

However, in the case of the present modified example, the housing covers 112-1 and 112-2 of the above-described modified examples may be omitted. In the present modified example, functions of the housing covers 112-1 and 112-2 may be replaced by the fastening member 111*c*-3.

Meanwhile, the housing 110-3 of the present modified example may include the fastening member 111*c*-3. The fastening member 111*c*-3 may be fastened to a shaft ground ring 120 and the housing body 111-3 to fix the shaft ground ring 120 to the housing body 111-3.

In the present modified example, the fastening member 111*c*-3 may have functions of both the housing covers 112-1 and 112-2 of the above-described modified examples. Specifically, the fastening member 111*c*-3 may be formed so that one end of the fastening member 111*c*-3 is in contact with and supported by the housing body 111-3 and the other end is in contact with and supported by the shaft ground ring 120 to fixedly press the housing body 111-3 and the shaft ground ring 120. As an example, the fastening member 111*c*-3 of the present modified example may include a rivet having heads at two ends.

Figure 5:
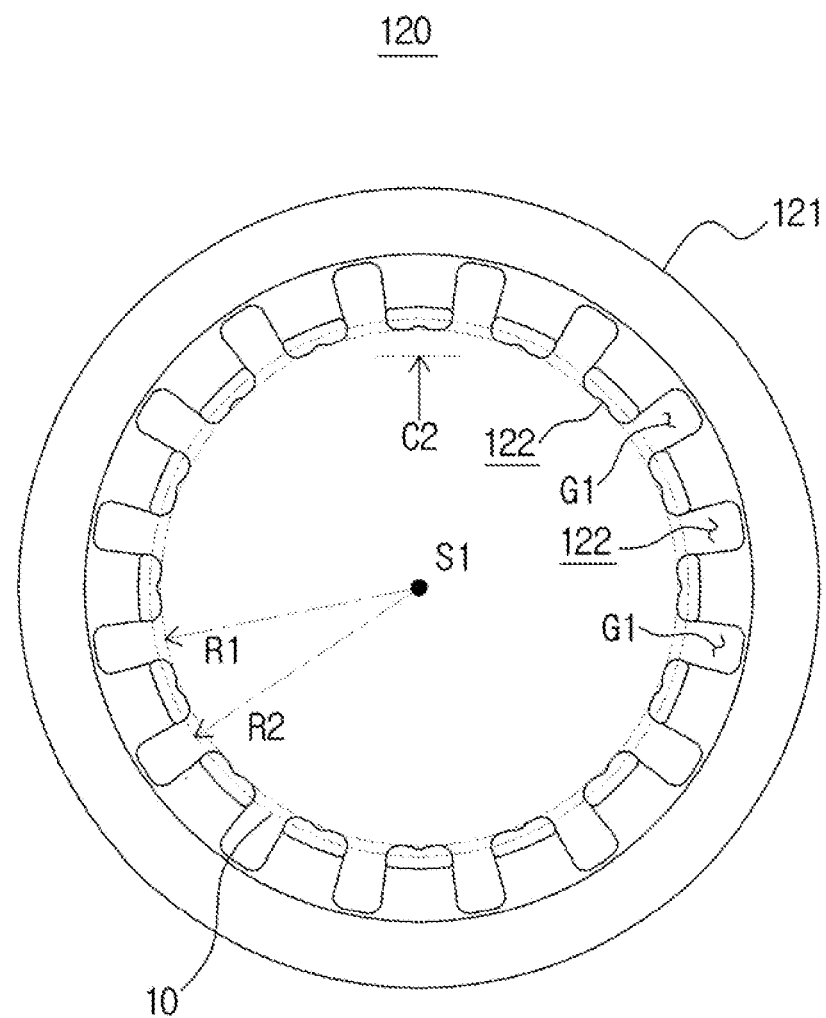
FIG. 5 is a rear view illustrating a shaft ground ring illustrated in FIG. 1.

FIG. 5 is a rear view illustrating the shaft ground ring illustrated in FIG. 1.

Referring to FIG. 5, the shaft ground ring 120 may be formed in a substantially circular ring shape. The shaft ground ring 120 may be disposed between the housing body 111 and the housing cover 112 and fixed to the housing 110.

The shaft ground ring 120 of the present embodiment may include a ring body 121.

The ring body 121 may have a predetermined cross-sectional shape and be formed to extend in a circular ring shape. In the present embodiment, it is assumed that the ring body 121 has a cross section having a substantially rectangular shape (see FIG. 3).

Meanwhile, the shaft ground ring 120 of the present embodiment may include the plurality of ground protrusions 122.

The ground protrusion 122 may be formed to protrude from an inner circumferential portion of the ring body 121 toward the shaft 10. An end portion of the ground protrusion 122 may be disposed in contact with the outer surface of the shaft 10.

The plurality of ground protrusions 122 may be provided, and disposed on the inner circumferential portion of the ring body 121 to be spaced a predetermined gap from each other in the circumferential direction. That is, the plurality of ground protrusions 122 may be disposed to be spaced apart from each other in the circumferential direction about the central axis S1 in the front-rear direction. Accordingly, the shaft 10 may be in proper contact with the ground protrusions 122 throughout an entire section of the shaft 10 in the circumferential direction.

The gap G1 may be formed between the ground protrusions 122 adjacent in the circumferential direction. The gaps G1 may be defined as an empty space between the ground protrusions 122 adjacent in the circumferential direction. Each gap G1 may provide a flow path in the front-rear direction between the ground protrusions 122 adjacent in the circumferential direction. Accordingly, oil and the like present on the outer surface of the shaft 10 can flow through the gap G1 in the front-rear direction.

In the case of the present embodiment, a total of 16 ground protrusions 122 are illustrated, and the gap G1 is illustrated to be substantially smaller than a circumferential width of the ground protrusion 122 by a predetermined extent. However, the number of the ground protrusions 122, the width of the gap G1, and the like are not necessarily limited thereto.

Meanwhile, the shaft ground ring 120 may be fastened to an outer circumferential portion of the shaft 10. Specifically, the shaft ground ring 120 may be fastened to the shaft 10 so that the plurality of ground protrusions 122 are in contact with the outer circumferential surface of the shaft 10.

In an initial state, a first radius R1 of a circle formed by the plurality of ground protrusions 122 may be slightly smaller than a second radius R2 of the outer circumferential surface of the shaft 10. In this case, the initial state is a state before the shaft ground ring 120 is installed around the shaft 10 and an external force is not applied thereto. In addition, the first radius R1 is a radius of a virtual circle connecting end portions of the ground protrusions 122 facing the central axis S1.

In the above-described case, the plurality of ground protrusions 122 may be elastically deformed to a predetermined extent from the initial state having the first radius R1 and coupled to the shaft 10 having the second radius R2.

Figure 6:
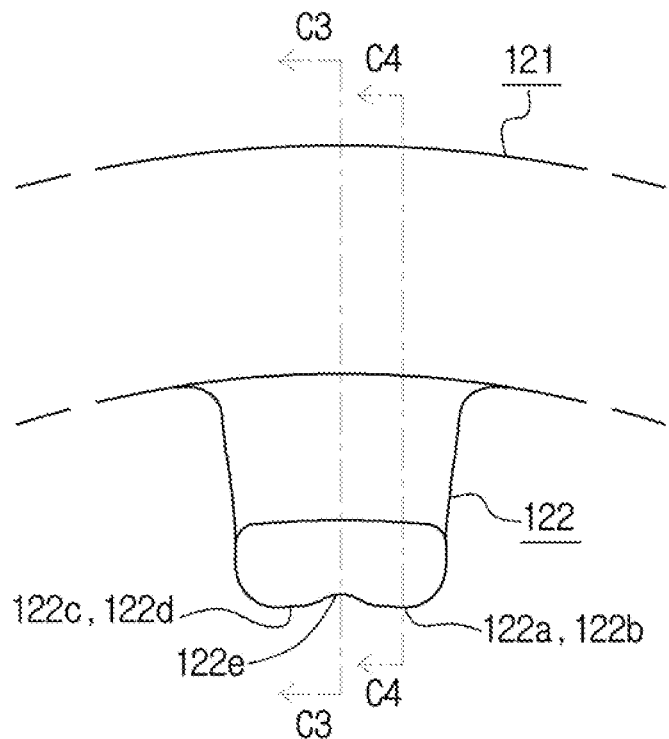
FIG. 6 is an enlarged view illustrating a ground protrusion illustrated in FIG. 5.

FIG. 6 is an enlarged view illustrating the ground protrusion illustrated in FIG. 5.

Referring to FIG. 6, the ground protrusion 122 may be formed to extend from the ring body 121 to protrude toward the central axis S1.

In this case, first to four contact points 122a to 122d may be formed at the end portion of the ground protrusion 122 facing the central axis S1.

Specifically, the ground protrusion 122 may include the first and second contact points 122a and 122b disposed on one side (right side in the drawing) in the circumferential direction and the third and fourth contact points 122c and 122d disposed on the opposite side (left side in the drawing). Although not clearly illustrated in FIG. 5, the first and the second contact points 122a and 122b may be disposed to be spaced apart from each other in the front-rear direction in a direction of the central axis S1. In addition, the third and fourth contact points 122c and 122d may be disposed to be spaced apart from each other in the front-rear direction in the direction of the central axis S1 (see FIG. 7).

Each of the first to fourth contact points 122a to 122d may be formed to protrude a predetermined extent from the end portion of the ground protrusion 122 toward the central axis S1. In an ideal installation state, the first to fourth contact points 122a to 122d are to be in contact with the outer circumferential surface of the shaft 10. That is, in the ideal installation state, the ground protrusion 122 of the present embodiment is to be in contact with the shaft 10 at four points of the first to fourth contact points 122a to 122d.

Meanwhile, the ground protrusion 122 may include a second flow path 122e.

The second flow path 122e may be formed between the first and second contact points 122a and 122b and the third and fourth contact points 122c and 122d. That is, as the first to fourth contact points 122a to 122d protrude in predetermined shapes at each position, the second flow path 122e having a concave shape may be formed between the first and second contact points 122a and 122b and the third and fourth contact points 122c and 122d. The second flow path 122e may be formed to extend in the front-rear direction along the central axis S1.

Figure 7:
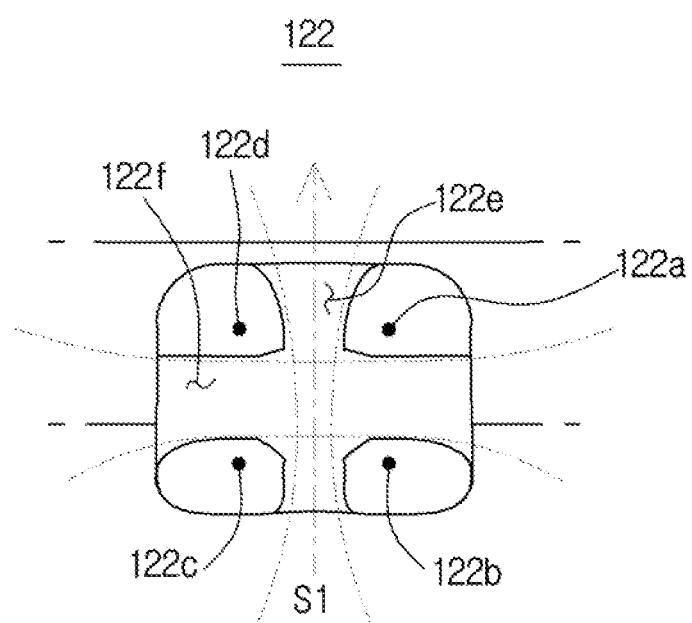
FIG. 7 is an enlarged view illustrating the ground protrusion illustrated in FIG. 5 in a different direction.

FIG. 7 is an enlarged view illustrating the ground protrusion illustrated in FIG. 5 in a different direction. In FIG. 7, the ground protrusion is illustrated when viewed in a C2 direction indicated in FIG. 5.

Referring to FIG. 7, the first and second contact points 122a and 122b may be disposed to be spaced a predetermined distance from the third and fourth contact points 122c and 122d in the circumferential direction. In addition, the first and fourth contact points 122a and 122d may be disposed to be spaced a predetermined distance from the second and third contact points 122b and 122c in the front-rear direction in the direction of the central axis S1. That is, the first contact point 122a may be disposed to be spaced the predetermined distance from the second contact point 122b in the front-rear direction at one side (right side in the drawing) in the circumferential direction, and the third contact point 122c may be disposed to be spaced the predetermined distance from the fourth contact point 122d in the front-rear direction at the opposite side (left side in the drawing).

For reference, in the present specification, the contact points 122b to 122d are sequentially referred to as the second to fourth contact points 122b to 122d clockwise from the first contact point 122a for the sake of convenience.

The second flow path 122e may be formed to extend in the front-rear direction between the first contact point 122a and the fourth contact point 122d and between the second contact point 122b and the third contact point 122c.

In addition, the ground protrusion 122 may include a first flow path 122*f*.

The first flow path 122*f* may be formed between the first and fourth contact points 122*a* and 122*d* and the second and third contact points 122*b* and 122*c*. That is, as the first to fourth contact points 122*a* to 122*d* protrude in the predetermined shapes at each position, the first flow path 122*f* having a concave shape may be formed between the first and fourth contact points 122*a* and 122*d* and the second and third contact points 122*b* and 122*c*. The first flow path 122*f* may be formed to extend on the end portion of the ground protrusion 122 in the circumferential direction.

The first flow path 122*f* may intersect the second flow path 122*e* to form a flow path having a cross shape. Accordingly, the first flow path 122*f* in the circumferential direction and the second flow path 122*e* in the front-rear direction may be formed due to the first to fourth contact points 122*a* to 122*d* on the end portion of the ground protrusion 122. The first and second flow paths 122*e* and 122*f* may provide flow paths for cooling oil to flow in the front-rear direction or left-right direction of the shaft 10.

Meanwhile, a contact portion between each of the first to fourth contact points 122*a* to 122*d* and the shaft 10 may be formed in a gently curved shape. In addition, each of the first to fourth contact points 122*a* to 122*d* may be in point contact with the shaft 10 or in surface contact with the shaft 10 at a small area corresponding to a point. This is to reduce friction with the shaft 10 and guide a smooth flow of cooling oil.

Figure 8:
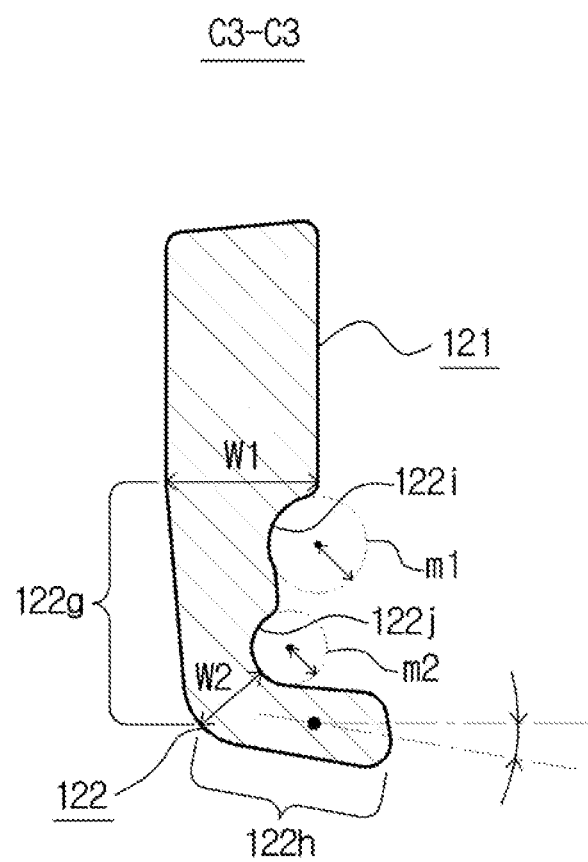
FIG. 8 is a first cross-sectional view illustrating the ground protrusion illustrated in FIG. 6.
Figure 9:
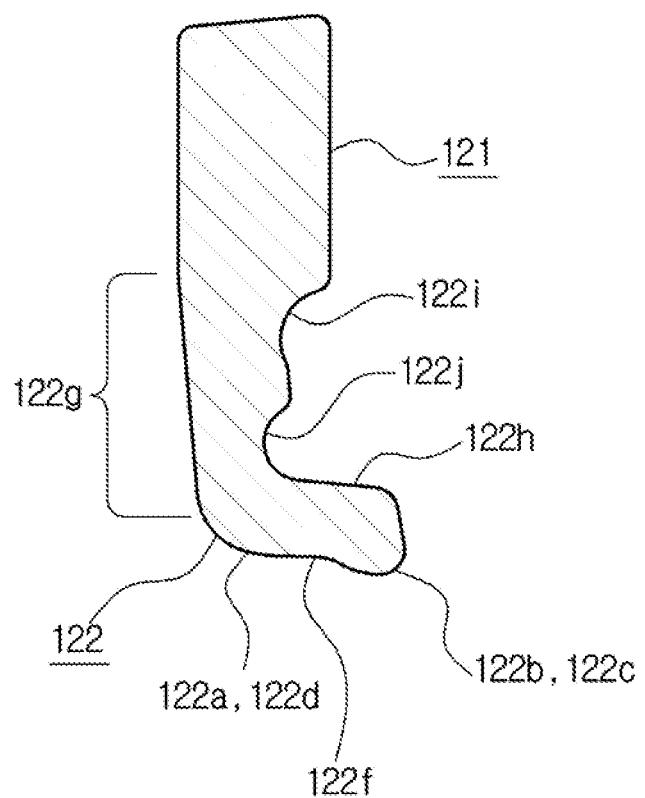
FIG. 9 is a second cross-sectional view illustrating the ground protrusion illustrated in FIG. 6.

FIG. 8 is a first cross-sectional view illustrating the ground protrusion illustrated in FIG. 6. FIG. 9 is a second cross-sectional view illustrating the ground protrusion illustrated in FIG. 6. In FIG. 8, a cross section of the ground protrusion along line C3-C3 illustrated in FIG. 6 is illustrated. In FIG. 9, a cross section of the ground protrusion along line C4-C4 illustrated in FIG. 6 is illustrated.

Referring to FIGS. 8 and 9, the ground protrusion 122 may include a longitudinal extension 122*g* extending from the ring body 121 and a lateral extension 122*h* extending from an end portion of the longitudinal extension 122*g* in a transverse direction.

The longitudinal extension 122*g* may be formed to extend to a predetermined extent inward from the ring body 121 in the radial direction toward the central axis S1. In order to more properly correspond to rotation or a surface shape of the shaft 10, a second width W2 of a lower end of the longitudinal extension 122*g* may be smaller than a first width W1 of an upper end of the longitudinal extension 122*g* by a predetermined extent. In addition, the longitudinal extension 122*g* may have a shape of which a width decreases generally from the first width W1 to the second width W2.

One or more guide grooves 122*i* and 122*j* may be formed in the longitudinal extension 122*g*. The guide grooves 122*i* and 122*j* may induce proper elastic deformation of the ground protrusion 122 to correspond to the shaft 10.

Preferably, a first guide groove 122*i* and a second guide groove 122*j* may be formed in the longitudinal extension 122*g*. The first and second guide grooves 122*i* and 122*j* may be disposed to be spaced a predetermined distance from each other in a longitudinal direction of the longitudinal extension 122*g*.

More preferably, the first guide groove 122*i* may be disposed at one side (upper side in the drawing) of the longitudinal extension 122*g* adjacent to the ring body 121 to induce elastic deformation of the longitudinal extension 122*g* with respect to the ring body 121. In addition, the second guide groove 122*j* may be disposed at the other side (lower side in the drawing) of the longitudinal extension 122*g* adjacent to the lateral extension 122*h* to induce elastic deformation of the lateral extension 122*h* with respect to the longitudinal extension 122*g*.

The first guide groove 122*i* may be formed to be recessed to a predetermined extent at one side of the longitudinal extension 122*g* adjacent to the ring body 121. In addition, the second guide groove 122*j* may be formed to be recessed to a predetermined extent at the other side of the longitudinal extension 122*g* adjacent to the lateral extension 122*h*.

As necessary, the first guide groove 122*i* may be concavely formed to have a curvature m1 greater than that of the second guide groove 122*j* by a predetermined extent. That is, the first guide groove 122*i* may be concavely formed to have a first curvature m1, and the second guide groove 122*j* may be concavely formed to have a second curvature m2 smaller than the first curvature m1 by the predetermined extent. The first and second guide grooves 122*i* and 122*j* may can secure a proper contact force against the shaft 10 and induce elastic deformation corresponding to a surface of the shaft 10.

Meanwhile, the lateral extension 122*h* may be formed to extend rearward from the end portion of the longitudinal extension 122*g*. In the initial state of not being in contact with the shaft 10, the lateral extension 122*h* may be formed to obliquely extend to approach the central axis S1. Accordingly, the second and third contact points 122*b* and 122*c* at a rear end of the lateral extension 122*h* are in close contact with the shaft 10 with proper elasticity.

For reference, in FIG. 9, the initial state before the ground protrusion 122 is in contact with the shaft 10 is illustrated. In the initial state, the first and fourth contact points 122*a* and 122*d* and the first flow path 122*f* may be generally disposed to be coplanar with each other. The first flow path 122*f* between the first and fourth contact point 122*a* and 122*d* and the second and third contact points 122*b* and 122*c* may be more clearly formed as the lateral extension 122*h* is elastically deformed when the first and fourth contact point 122*a* and 122*d* and the second and third contact points 122*b* and 122*c* are in contact with the shaft 10.

Figure 10:
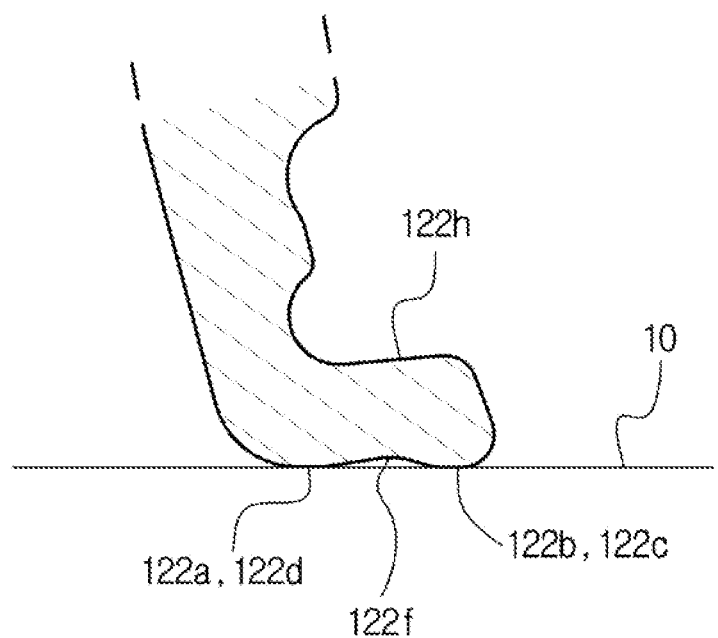
FIG. 10 is a view illustrating an installation state of the ground protrusion illustrated in FIG. 9.

FIG. 10 is a view illustrating the installation state of the ground protrusion illustrated in FIG. 9. In FIG. 10, the ideal installation state of the ground protrusion is illustrated.

Referring to FIG. 10, the ground protrusion 122 in the state of FIG. 9 may be elastically deformed to a predetermined extent in the form illustrated in FIG. 10 while in contact with the outer circumferential surface of the shaft 10. According to the elastic deformation of the ground protrusion 122, the second and third contact points 122*b* and 122*c* may be in elastic contact with the outer circumferential surface of the shaft 10, and the first and fourth contact points 122*a* and 122*d* may be in elastic contact with the outer circumferential surface of the shaft 10 at positions spaced a predetermined distance from the second and third contact points 122*b* and 122*c* in a forward direction.

According to such a contact form described above, the first flow path 122*f* may be formed between the first and fourth contact points 122*a* and 122*d* and the second and third contact points 122*b* and 122*c*. The first flow path 122*f* may extend in the circumferential direction of the shaft ground ring 120 (see FIG. 7).

In the assembly 100 of the present embodiment, the ground protrusion 122 is in contact with the shaft 10 and thus can discharge a leakage current flowing along the shaft 10 to the outside. Accordingly, electrical erosion of the bearing can be prevented.

In addition, in the assembly 100 of the present embodiment, the flow paths 122*f* and 122*e* in the front-rear or left-right direction (circumferential direction) may be formed while the plurality of contact points 122a to 122d maintains contact states. The first flow path 122f in the circumferential direction is connected to the outer circumferential surface of the shaft 10 through the gap G1, and the second flow path 122e in the front-rear direction is directly connected to the outer circumferential surface of the shaft 10. Accordingly, cooling oil and the like can be quickly discharged to the outside, and thus insulation performance degradation caused by oil can be effectively prevented.

In addition, the assembly 100 of the present embodiment uses a method in which the plurality of contact points 122a to 122d are in contact with the shaft 10 and thus can more properly respond to misalignment, imbalance of the shaft 10, and the like during assembly.

In addition, the assembly 100 of the present embodiment maintains a proper ground state even in an oil cooling environment using oil as a cooling medium according to the characteristics and thus can be suitably applied to a high-capacity electric motor.

Figure 11:
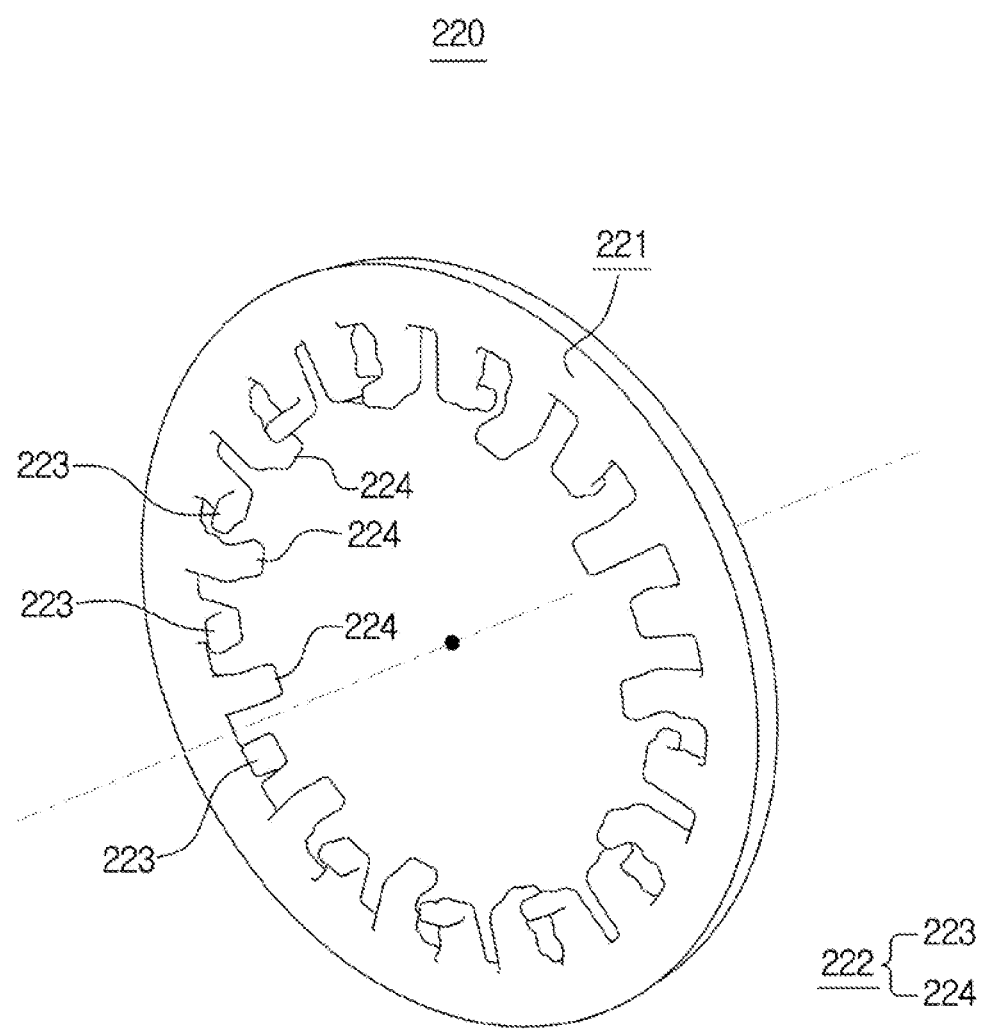
FIG. 11 is a front perspective view illustrating a shaft ground ring according to a second embodiment of the present invention.
Figure 12:
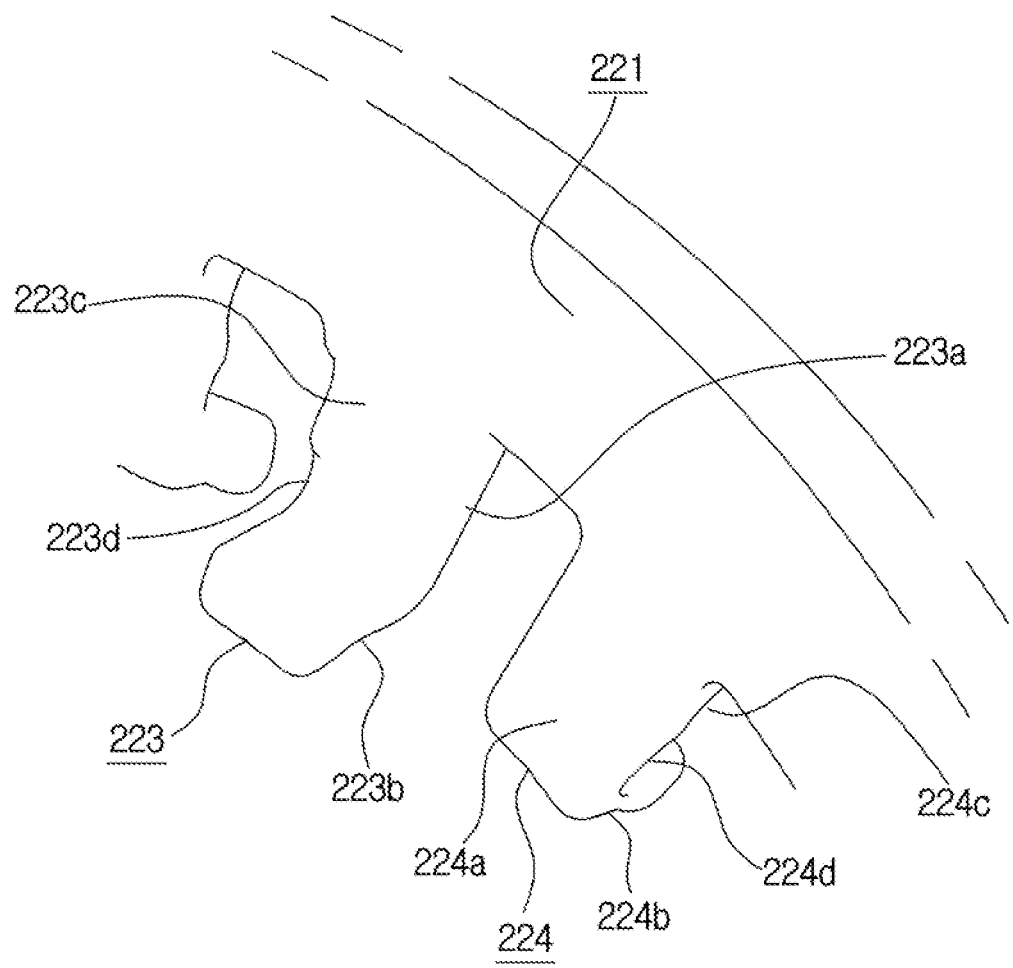
FIG. 12 is an enlarged view illustrating the shaft ground ring illustrated in FIG. 11.

FIG. 11 is a front perspective view illustrating a shaft ground ring according to another embodiment of the present invention. FIG. 12 is an enlarged view illustrating the shaft ground ring illustrated in FIG. 11.

In FIGS. 11 and 12, another embodiment of the shaft ground ring 120 is illustrated. Specifically, a shaft ground ring 220 of the present embodiment may include a ring body 221 and a plurality of ground protrusions 222 formed on the ring body 221. This is similar to the above-described embodiment.

In this case, the ground protrusions 222 according to the present embodiment may include first ground protrusions 223 and second ground protrusions 224.

The first and second ground protrusions 223 and 224 may be formed similarly to each other and formed in different directions. That is, the first ground protrusions 223 may be formed to face forward, and the second ground protrusion 224 may be formed to face rearward.

Specifically, each of the first ground protrusions 223 may include a first longitudinal extension 223a extending from the ring body 221 and a first lateral extension 223b extending forward from an end portion of the first longitudinal extension 223a. Similarly to the ground protrusion 122 of the above-described embodiment, first and second guide grooves 223c and 223d may be formed in a front surface of the first longitudinal extension 223a. Each of the second ground protrusions 224 may also include a second longitudinal extension 224a extending from the ring body 221 and a second lateral extension 224b extending rearward from an end portion of the second longitudinal extension 224a. Similarly to the ground protrusion 122 of the above-described embodiment, first and second guide grooves 224c and 224d may be formed in a rear surface of the second longitudinal extension 224a.

Meanwhile, the first and second ground protrusions 223 and 224 may be provided as a plurality of first ground protrusions 223 and a plurality of second ground protrusions 224. In addition, among the plurality of first and second ground protrusions 223 and 224, one or more first protrusions 223 and one or more second ground protrusions 224 may be alternately repeatedly disposed in a circumferential direction. In the present embodiment, a case in which one first ground protrusion 223 and one second ground protrusion 224 are alternately repeatedly disposed is illustrated. As another example, a case in which two first ground protrusions 223 and two second ground protrusions 224 are alternately repeatedly disposed or a case in which different numbers of the first and second ground protrusions 223 and 224 are be alternately repeatedly disposed such as two first ground protrusions 223 and three second ground protrusions 224 are alternately repeatedly disposed may be considered.

The shaft ground ring 220 of the embodiment may have an advantage that an assembly direction is not fixed in a front-rear direction. That is, since the first and second ground protrusions 223 and 224 extending forward and rearward are provided on one ring body 221, the shaft ground ring 220 can be assembled without being limited to the specific assembly direction.

Figure 13:
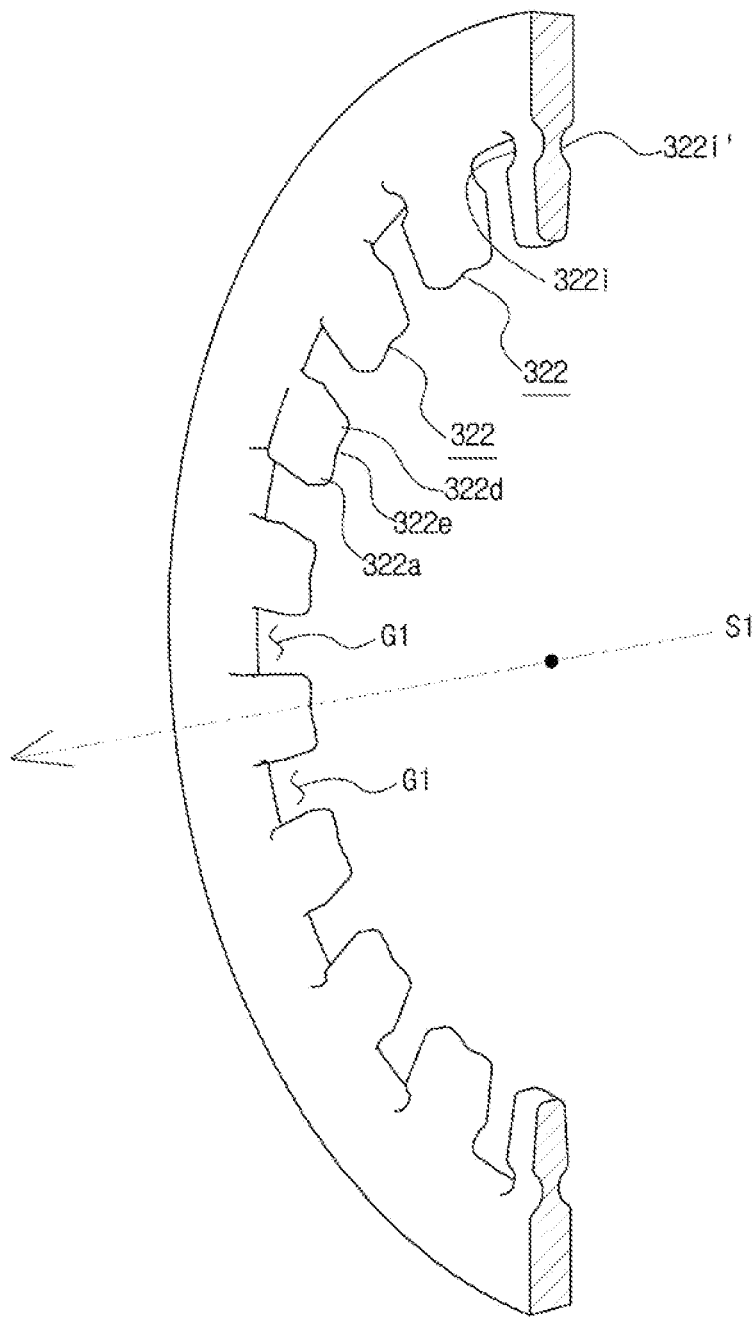
FIG. 13 is a partial cross-sectional perspective view illustrating a shaft ground ring according to a third embodiment of the present invention.

FIG. 13 is a partial cross-sectional perspective view illustrating a shaft ground ring according to a third embodiment of the present invention.

Referring to FIG. 13, a shaft ground ring 320 of the present embodiment may include a ring body 321 and a plurality of ground protrusions 322 formed on the ring body 321. This is similar to the above-described embodiments.

In the shaft ground ring 320 of the present embodiment, in a shape of each of the ground protrusions 322 may be different from those of the above-described embodiments.

Specifically, in the present embodiment, the ground protrusions 322 may be formed to protrude from the ring body 321 toward a central axis S1. The plurality of ground protrusions 322 may be provided and disposed to be spaced a predetermined gap G1 from each other along an inner circumference of the ring body 321.

In this case, the ground protrusion 322 of the present embodiment does not have a front-rear directionality unlike those of the above-described embodiments. That is, the ground protrusion 322 may be formed to be substantially coplanar with the ring body 321 and extend toward the central axis S1. In other words, the ground protrusion 322 may formed to extend in a direction substantially perpendicular to the central axis S1.

As described above, the shaft ground ring 320 of the present embodiment may be assembled with a shaft 10 regardless of an assembly direction in a front-rear direction. This is similar to the above-described second embodiment.

In addition, the ground protrusion 322 of the present embodiment may have guide grooves 322i and 322i' formed in a platform portion extending from the ring body 321. In the present embodiment, the guide grooves 322i and 322i' may be generally formed in an outer portion of the ground protrusion 322 adjacent to the ring body 321 in a radial direction.

Each of the guide grooves 322i and 322i' may be concavely formed inward to a predetermined extent in a thickness direction of the ground protrusion 322. In addition, in the present embodiment, the guide grooves 322i and 322i' may be formed on both a front surface and a rear surface of the ground protrusion 322. Accordingly, in the ground protrusion 322, the platform portion connected to the ring body 321 may have a smaller thickness than the other portion.

The guide grooves 322i and 322i' induce elastic deformation of the ground protrusion 322 so that the ground protrusion 322 may be in proper close contact with the shaft 10.

In this case, the guide grooves 322i and 322i' of the present embodiment are formed as a pair of guide grooves 322i and 322i' in the front surface and the rear surface and thus can properly correspond to the assembly direction of the shaft ground ring 320 in the front-rear direction. That is, in the illustrated state, when the shaft 10 is inserted into the shaft ground ring 320 in a forward direction, elastic deformation of the ground protrusion 322 is induced by the guide groove 322i' at a rear side, and thus proper assembly can be performed. Conversely, when the shaft 10 is inserted into the shaft ground ring 320 in a rearward direction, elastic deformation of the ground protrusion 322 is induced by the guide groove 322*i* at a front side, and thus proper assembly can be performed.

Meanwhile, in the ground protrusion 322 of the present embodiment, a first contact point 322*a* and a fourth contact point 322*d* may be formed on an end portion facing the shaft 10.

In the ground protrusion 322 of the present embodiment, the second contact point 122*b* and the third contact point 122*c* are omitted compared to the above-described embodiments. The first contact point 322*a* may be disposed to be spaced a predetermined distance from the fourth contact point 322*d* in a circumferential direction, and a second flow path 322*e* may be provided between the first contact point 322*a* and the fourth contact point 322*d*. The second flow path 322*e* may provide a flow path in the front-rear direction. In the present embodiment, the first flow path 122*f* in the circumferential direction may be omitted.

Figure 14:
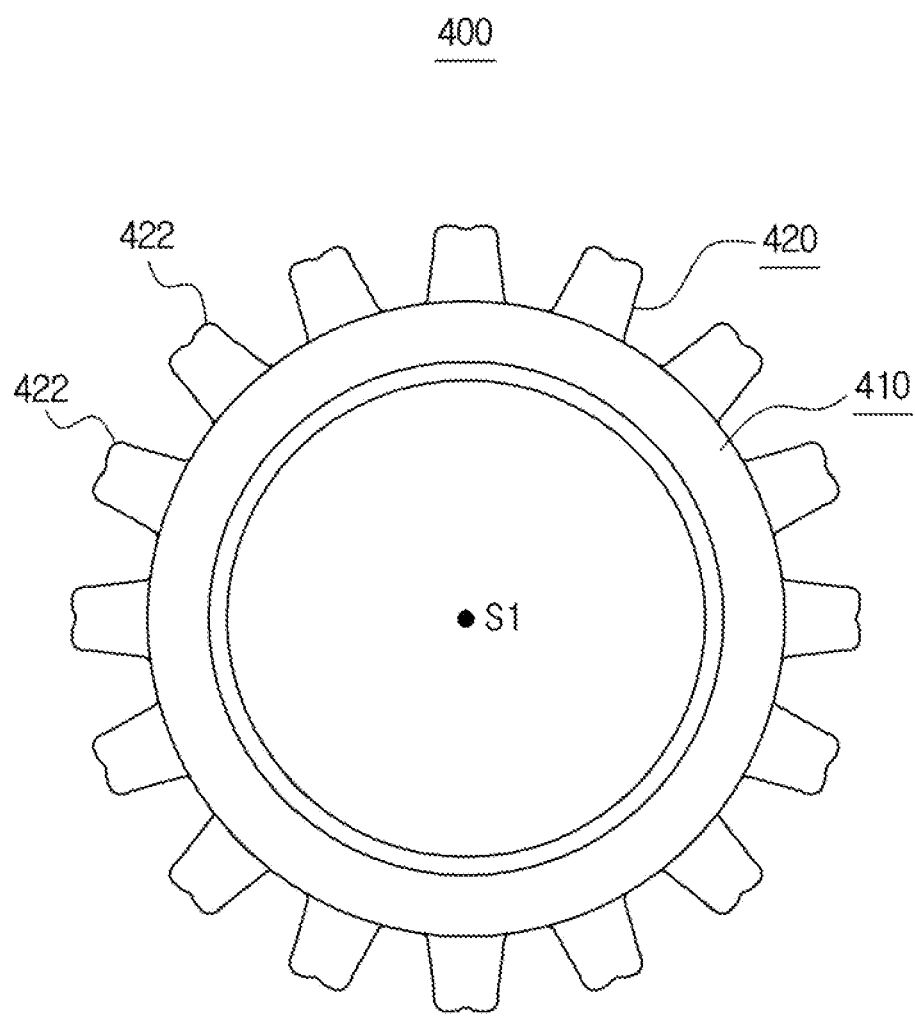
FIG. 14 is a front view illustrating a shaft ground ring assembly according to a fourth embodiment of the present invention.
Figure 15:
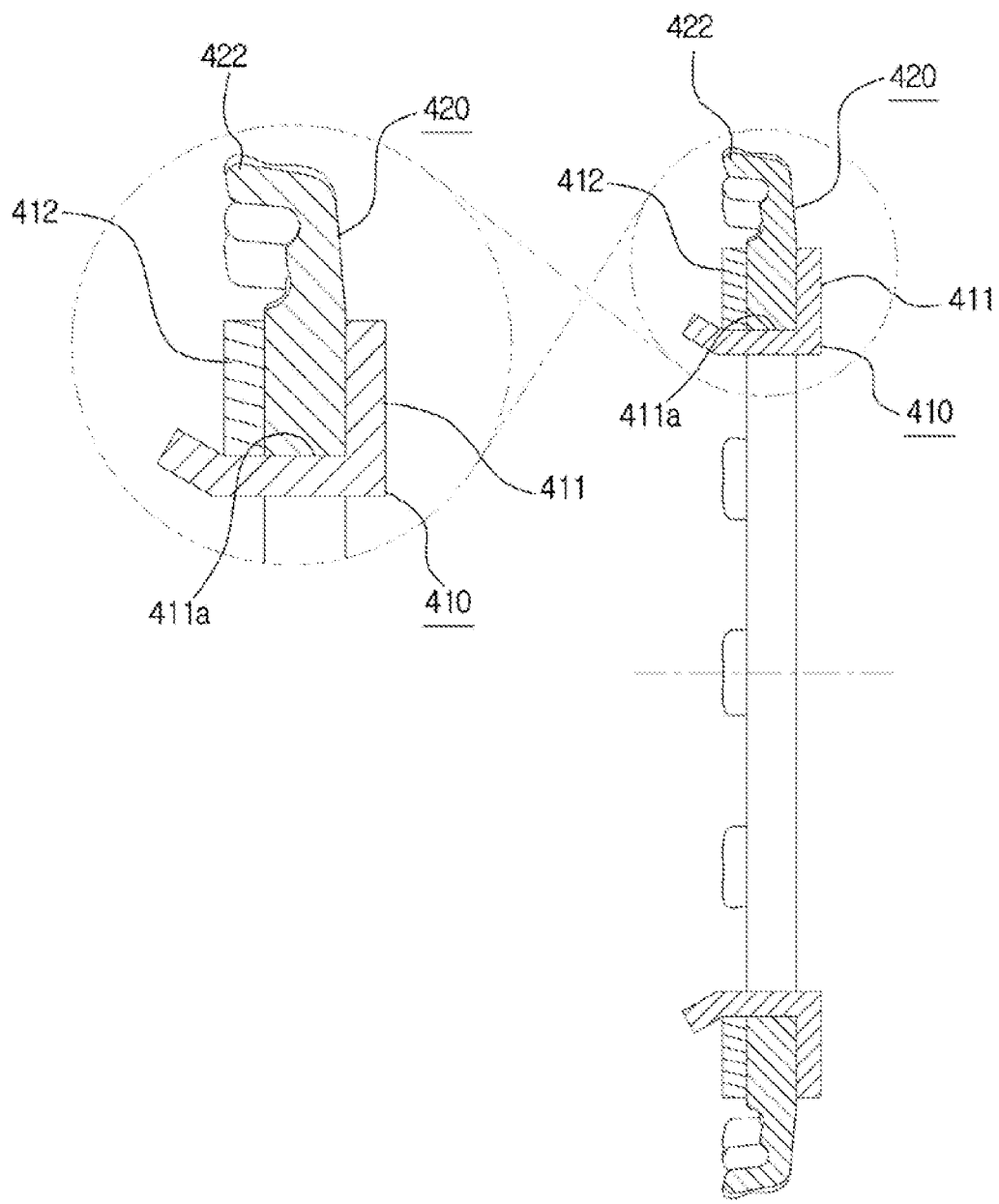
FIG. 15 is a cross-sectional view illustrating a shaft ground ring illustrated in FIG. 14.

FIG. 14 is a front view illustrating a shaft ground ring assembly according to a fourth embodiment of the present invention. FIG. 15 is a cross-sectional view illustrating a shaft ground ring illustrated in FIG. 14. In FIG. 15, a cross section of the shaft ground ring along line C4-C4 illustrated in FIG. 14 is illustrated.

Referring to FIGS. 14 and 15, a shaft ground ring assembly 400 of the present embodiment may include a housing 410 and a shaft ground ring 420.

In this case, the present embodiment is different from the above-described embodiments in that ground protrusions 422 of the shaft ground ring 420 are formed on an outer circumferential portion of the shaft ground ring 420.

Specifically, the housing 410 of the present embodiment may include a housing body 411 and a housing cover 412, and the shaft ground ring 420 may be supported between the housing body 411 and the housing cover 412.

In this case, the housing 410 may be installed on a shaft. That is, the present embodiment may have the housing 410 fastened to the shaft and directly grounded. The shaft may be press-fitted into the housing 410. In addition, the shaft ground ring 420 is fastened to the housing 410, and thus the housing 410 and the shaft ground ring 420 may rotate with the shaft.

In addition, the ground protrusions 422 may be formed at an outer side of the shaft ground ring 420 in a radial direction. The plurality of ground protrusions 422 may be formed and disposed along an outer circumference of the shaft ground ring 420 to be spaced a predetermined gap from each other. In general, each of the ground protrusions 422 is formed similarly to those of the above-described embodiments, and the ground protrusions 422 may be disposed in a reverse direction toward the outside in the radial direction. In the present embodiment, only a relative rotating part is changed conversely, and functions thereof may be the same as or similar to those of the above-described embodiments.

While embodiments of the present invention have been described above, the present invention may be variously modified and changed by those skilled in the art by adding, changing, and removing components without departing from the range of the spirit of the present invention defined by the claims, and will fall within the scope of the present invention.

The invention claimed is:

1. A shaft ground ring fastened to a shaft (10) of an electric motor to prevent electrical erosion caused by a leakage current, the shaft ground ring comprising:

a ring body (121) formed to extend to surround an outer circumferential surface of the shaft (10); and a plurality of ground protrusions (122) formed to protrude from an inner circumferential surface of the ring body (121), being in contact with the outer circumferential surface of the shaft (10), and disposed to be spaced a predetermined gap (G1) from each other along the ring body (121), wherein each of the ground protrusions (122) includes:

a longitudinal extension (122*g*) extending from the ring body (121) toward the shaft (10), and a lateral extension (122*h*) extending from an end portion of the longitudinal extension (122*g*) in a forward or rearward direction and formed to obliquely extend to approach a central axis (S1) of the shaft (10) in an initial state of not being in contact with the shaft (10), and wherein the lateral extension (122*h*) includes:

a first contact point (122*a*) in contact with one side of the outer circumferential surface of the shaft (10), a second contact point (122*b*) disposed to be spaced apart from the first contact point (122*a*) in a front-rear direction, and a first flow path (122*f*) formed between the first contact point (122*a*) and the second contact point (122*b*) in a circumferential direction by elastically deforming the lateral extension (122*h*) according to installation of the shaft (10).

2. The shaft ground ring of claim 1, wherein the gap (G1) forms a flow path on the outer circumferential surface of the shaft (10) in a front-rear direction.

3. The shaft ground ring of claim 1, wherein the lateral extension (122*h*) further includes:

a third contact point (122*c*) disposed to be spaced apart from the second contact point (122*b*) in the circumferential direction; and a fourth contact point (122*d*) disposed to be spaced apart from the third contact point (122*c*) in the front-rear direction to correspond to the first contact point (122*a*).

4. The shaft ground ring of claim 3, wherein the lateral extension (122*h*) further includes:

a second flow path (122*e*) extending between the first and second contact points (122*a*, 122*b*) and the third and fourth contact points (122*c*, 122*d*) in the front-rear direction.

5. The shaft ground ring of claim 1, wherein each of the ground protrusions (122) further includes:

a first guide groove (122*i*) concavely recessed between the ring body (121) and the longitudinal extension (122*g*) to have a first curvature (m1) and configured to induce elastic deformation of the longitudinal extension (122*g*); and a second guide groove (122*j*) concavely recessed between the longitudinal extension (122*g*) and the lateral extension (122*h*) to have a second curvature (m2) smaller than the first curvature (m1) and configured to induce elastic deformation of the lateral extension (122*h*).

6. The shaft ground ring of claim 1, wherein the ring body (121) and the ground protrusions (122) are integrally formed with each other and partially or entirely formed of a conductive plastic material.

7. A shaft ground ring fastened to a shaft (10) of an electric motor to prevent electrical erosion caused by a leakage current, the shaft ground ring comprising:

a ring body (121) formed to extend to surround an outer circumferential surface of the shaft (10); and a plurality of ground protrusions (122) formed to protrude from an inner circumferential surface of the ring body (121), being in contact with the outer circumferential surface of the shaft (10), and disposed to be spaced a predetermined gap (G1) from each other along the ring body (121), wherein the ground protrusions include:

a plurality of first ground protrusions (223), and a plurality of second ground protrusions (224) alternately repeatedly disposed with the plurality of first ground protrusions (223), wherein each of the first ground protrusions (223) includes a first longitudinal extension (223a) extending from the ring body and a first lateral extension (223b) extending forward from an end portion of the first longitudinal extension (223a), and each of the second ground protrusions (224) includes a second longitudinal extension (224a) extending from the ring body and a second lateral extension (224b) extending rearward from an end portion of the second longitudinal extension (224a), wherein each of the first ground protrusions and the second ground protrusions includes:

a longitudinal extension extending from the ring body toward the shaft, and a lateral extension extending from an end portion of the longitudinal extension in a forward or rearward direction and formed to obliquely extend to approach a central axis of the shaft in an initial state of not being in contact with the shaft, and wherein the lateral extension includes:

a first contact point in contact with one side of the outer circumferential surface of the shaft, a second contact point disposed to be spaced apart from the first contact point in a front-rear direction, and a first flow path formed between the first contact point and the second contact point in a circumferential direction by elastically deforming the lateral extension according to installation of the shaft.

8. A shaft ground ring fastened to a shaft (10) of an electric motor to prevent electrical erosion caused by a leakage current, the shaft ground ring comprising:

a ring body (121) formed to extend to surround an outer circumferential surface of the shaft (10); and a plurality of ground protrusions (122) formed to protrude from an inner circumferential surface of the ring body (121), being in contact with the outer circumferential surface of the shaft (10), and disposed to be spaced a predetermined gap (G1) from each other along the ring body (121), wherein each of the ground protrusions includes:

a first contact point (322a) and a fourth contact point (322d) spaced apart from each other in a circumferential direction of the shaft and being in contact with the outer circumferential surface of the shaft to form a second flow path (322e) between the first contact point (322a) and the fourth contact point (322d) in a front-rear direction, and guide grooves (322i, 322i') formed so that a front surface and a rear surface of the ground protrusion are concavely recessed at a connection portion with the ring body and configured to induce elastic deformation in a forward or rearward direction when the shaft is inserted into and fastened to the shaft ground ring.

9. A shaft ground ring assembly comprising:

a shaft ground ring (120) of claim 1; and a housing (110) fastened to accommodate the shaft ground ring (120) therein.

10. The shaft ground ring assembly of claim 9, wherein the housing (110) includes:

a housing body (111) having a predetermined cross section and formed to extend in a circumferential direction; and a housing cover (112) fastened to the housing body (111) to restrict separation of the shaft ground ring (120), wherein the housing body (111) includes a ring supporting surface (111a) in contact with an outer circumferential surface of the shaft ground ring (120) and configured to support the outer circumferential surface of the shaft ground ring (120) and a swaging (111b) formed behind the ring supporting surface (111a), extending to be inclined rearward to approach a central axis (S1), and configured to restrict rearward separation of the housing cover (112).

* * * * *